(12) United States Patent
Orzechowski et al.

(10) Patent No.: US 12,377,782 B2
(45) Date of Patent: Aug. 5, 2025

(54) BATTERY ELECTRIC VEHICLE ACTIVE SOUND AND VIBRATION ENHANCEMENT SYSTEMS

(71) Applicant: FCA US LLC, Auburn Hills, MI (US)

(72) Inventors: Jeffrey Orzechowski, Troy, MI (US); Brooke Bowen, Whitemore Lake, MI (US); Bradley R Gieske, Clarkston, MI (US); Brandon Sims, Shelby Township, MI (US); Rustyn Robinson, Waterford, MI (US); Divya Myneni, Troy, MI (US); Lora Vedder, Birmingham, MI (US)

(73) Assignee: FCA US LLC, Auburn Hills, MI (US)

( * ) Notice: Subject to any disclaimer, the term of this patent is extended or adjusted under 35 U.S.C. 154(b) by 346 days.

(21) Appl. No.: 17/981,724

(22) Filed: Nov. 7, 2022

(65) Prior Publication Data

US 2023/0145186 A1    May 11, 2023

Related U.S. Application Data

(60) Provisional application No. 63/277,373, filed on Nov. 9, 2021.

(51) Int. Cl.
*B60Q 5/00* (2006.01)
*G10K 15/02* (2006.01)

(52) U.S. Cl.
CPC ............ *B60Q 5/008* (2013.01); *G10K 15/02* (2013.01); *B60Y 2200/91* (2013.01)

(58) Field of Classification Search
CPC ..... B60Q 5/008; G10K 15/02; B60Y 2200/91
See application file for complete search history.

(56) References Cited

U.S. PATENT DOCUMENTS

| 1,935,788 A | * | 11/1933 | Critchfield | ............... | G10K 9/12 |
| | | | | | 116/142 R |
| 3,903,989 A | * | 9/1975 | Bauer | ...................... | H04R 1/26 |
| | | | | | 181/175 |

(Continued)

FOREIGN PATENT DOCUMENTS

| DE | 102020112680 A1 | 11/2021 |
| EP | 2293288 A1 | 3/2011 |

(Continued)

OTHER PUBLICATIONS

Blain, Loz. "Soundracer gadget makes a Tesla sound like a Shelby V8 (or whatever else you like)." New Atlas, Apr. 11, 2018, https://newatlas.com/soundracer-ev-engine-sound-eveess/54140/.

(Continued)

*Primary Examiner* — Steven Lim
*Assistant Examiner* — Son M Tang
(74) *Attorney, Agent, or Firm* — Jeremy J. Klobucar

(57) ABSTRACT

An exhaust sound enhancement (ESE) system for a vehicle without an internal combustion engine includes one or more speakers, an amplifier configured to generate and play sounds on the one or more speakers, and a tuned exhaust assembly with a housing configured to resonate, amplify and inter-modulate the sounds from the one or more speakers to mimic exhaust sounds that would be produced by a predetermined internal combustion engine.

19 Claims, 4 Drawing Sheets

(56) References Cited

U.S. PATENT DOCUMENTS

| | | | | |
|---|---|---|---|---|
| 4,237,340 | A * | 12/1980 | Klipsch | H04R 3/14 |
| | | | | 381/99 |
| 4,882,562 | A * | 11/1989 | Andrews | H04R 1/30 |
| | | | | 181/185 |
| 5,526,456 | A * | 6/1996 | Heinz | H04R 1/26 |
| | | | | 181/152 |
| 5,635,903 | A * | 6/1997 | Koike | B60Q 5/008 |
| | | | | 340/384.1 |
| 6,038,326 | A * | 3/2000 | Czerwinski | H04R 1/26 |
| | | | | 381/342 |
| 6,343,134 | B1 * | 1/2002 | Czerwinski | H04R 25/00 |
| | | | | 381/186 |
| 6,411,718 | B1 * | 6/2002 | Danley | H04R 1/26 |
| | | | | 381/342 |
| 6,628,796 | B2 * | 9/2003 | Adamson | H04R 1/26 |
| | | | | 381/342 |
| 6,981,570 | B2 * | 1/2006 | Dalbec | G10K 11/28 |
| | | | | 181/182 |
| 7,046,816 | B2 * | 5/2006 | Vandersteen | H04R 1/26 |
| | | | | 381/351 |
| 7,134,523 | B2 * | 11/2006 | Engebretson | H04R 1/288 |
| | | | | 381/387 |
| 7,454,022 | B2 * | 11/2008 | Neumann | H04S 1/002 |
| | | | | 381/59 |
| 7,760,899 | B1 * | 7/2010 | Graber | H04R 1/2842 |
| | | | | 381/342 |
| 7,979,147 | B1 * | 7/2011 | Dunn | G10K 15/02 |
| | | | | 381/61 |
| 8,050,442 | B1 * | 11/2011 | Graber | H04R 1/20 |
| | | | | 181/194 |
| 8,194,905 | B1 * | 6/2012 | Vinther, Sr. | H04R 1/30 |
| | | | | 381/342 |
| 8,299,904 | B2 * | 10/2012 | Konet | B60Q 5/008 |
| | | | | 340/384.1 |
| 8,320,581 | B2 | 11/2012 | Hera et al. | |
| 8,422,712 | B2 * | 4/2013 | Danley | H04R 1/345 |
| | | | | 381/339 |
| 8,452,038 | B2 * | 5/2013 | Buccafusca | G10K 11/025 |
| | | | | 381/342 |
| 9,156,401 | B2 * | 10/2015 | Takahashi | B60Q 5/008 |
| 9,227,567 | B2 * | 1/2016 | Fujii | G10K 15/02 |
| 9,333,911 | B2 | 5/2016 | Hera et al. | |
| 9,478,214 | B2 * | 10/2016 | Orth | B60Q 5/008 |
| 9,517,724 | B2 * | 12/2016 | Massimo | G08B 21/22 |
| 9,580,010 | B2 * | 2/2017 | Sakakibara | B60Q 5/008 |
| 9,728,176 | B2 | 8/2017 | Keck et al. | |
| 9,758,096 | B1 | 9/2017 | Valeri et al. | |
| 9,769,560 | B2 * | 9/2017 | Button | H04R 1/2865 |
| 9,793,870 | B1 | 10/2017 | Valeri et al. | |
| 9,815,405 | B2 * | 11/2017 | Tsuzuki | H03G 3/20 |
| 9,868,323 | B2 * | 1/2018 | Tsuzuki | G10K 9/13 |
| 9,881,602 | B2 | 1/2018 | Wiemeler et al. | |
| 10,065,561 | B1 * | 9/2018 | Bastyr | G10K 15/02 |
| 10,071,686 | B2 | 9/2018 | Reilly et al. | |
| 10,284,944 | B1 | 5/2019 | Steinkilberg | |
| 10,384,599 | B2 * | 8/2019 | Tanaka | B60L 3/12 |
| 10,414,337 | B2 * | 9/2019 | Kreifeldt | G10K 15/02 |
| 10,611,302 | B2 * | 4/2020 | Lee | B60L 3/12 |
| 10,773,711 | B2 | 9/2020 | Espig et al. | |
| 11,001,268 | B2 | 5/2021 | Orzechowski et al. | |
| 11,059,420 | B2 * | 7/2021 | Pyzik | H04R 3/12 |
| 11,128,947 | B2 * | 9/2021 | Darling | H04R 1/22 |
| 2002/0106097 | A1 * | 8/2002 | Danley | H04R 1/26 |
| | | | | 381/345 |
| 2004/0003961 | A1 * | 1/2004 | Gunness | H04R 1/30 |
| | | | | 181/189 |
| 2004/0005069 | A1 * | 1/2004 | Buck | H04R 1/30 |
| | | | | 181/177 |
| 2009/0220113 | A1 * | 9/2009 | Tiscareno | H04R 1/403 |
| | | | | 381/380 |
| 2011/0241868 | A1 * | 10/2011 | Iwamoto | B60Q 5/008 |
| | | | | 340/463 |
| 2012/0166042 | A1 * | 6/2012 | Kokido | B60Q 5/008 |
| | | | | 701/36 |
| 2013/0076504 | A1 | 3/2013 | Toshiaki | |
| 2015/0053499 | A1 * | 2/2015 | Won | F01N 1/065 |
| | | | | 181/228 |
| 2018/0319333 | A1 | 11/2018 | Tobias | |
| 2020/0074979 | A1 * | 3/2020 | Kim | G10H 5/007 |
| 2020/0402401 | A1 * | 12/2020 | Takamura | G06F 3/167 |
| 2021/0120331 | A1 * | 4/2021 | Menendez | H04R 1/345 |
| 2021/0138959 | A1 * | 5/2021 | Soni | G08G 1/16 |
| 2021/0221286 | A1 * | 7/2021 | Miura | H04R 3/00 |
| 2021/0289286 | A1 * | 9/2021 | Marin | G10K 15/02 |

FOREIGN PATENT DOCUMENTS

| | | | |
|---|---|---|---|
| WO | 2010000532 | A2 | 1/2010 |
| WO | 2020249660 | A1 | 12/2020 |

OTHER PUBLICATIONS

Day, Lewin. "Dodge Challenger, Charger and Hellcat Engines Will Die By 2024." The Drive, Nov. 22, 2021, https://www.thedrive.com/news/43247/dodge-challenger-charger-and-hellcat-engines-will-die-by-2024.

De La Garza, Alejandro. "Electric Cars Can Sound Like Anything. That's a Huge Opportunity to Craft the Soundscape of the Future." Time, Apr. 6, 2021, https://time.com/5951773/electric-car-sound-future/.

Szymkowski, Sean. "Make your Tesla Model 3 sound like a supercar with this incredible tech."—CNET, Mar. 11, 2020, https://www.cnet.com/roadshow/news/tesla-model-3-sound-supercar-milltek-app/.

Thor Electronic Exhaust. Aug. 4, 2018, https://thor-tuning.com/.

International Search Report and Written Opinion dated Feb. 24, 2023 for PCT/US2022/049190, International Filing Date Nov. 8, 2022.

\* cited by examiner

BATTERY ELECTRIC VEHICLE ACTIVE SOUND AND VIBRATION ENHANCEMENT SYSTEMS

CROSS REFERENCE TO RELATED APPLICATION

This application claims the benefit of U.S. Provisional Application No. 63/277,373, filed Nov. 9, 2021, the contents of which are incorporated herein in their entirety by reference thereto.

FIELD

The present application relates generally to passenger vehicles and, more particularly, to a battery electric vehicle with active sound and vibration enhancement systems.

BACKGROUND

Battery electric vehicles (BEV's) may provide a greener alternative to vehicles with internal combustion engines. However, BEV's can emit very low noise levels, which potentially pose a challenge to pedestrian aural awareness. Known solutions include creating electronic noises through external speakers on a vehicle. However, these systems do not produce an authentic engine sound nor are they as loud as a high-performance vehicle. Additionally, vehicles that have traditionally been considered "muscle cars" or "high performance" may no longer have a characteristic sound emitted through their exhaust systems. Further still, in vehicles with the known systems, the sound can feel unnatural due to lack of tactile feedback experienced with vehicles having internal combustion engines. Thus, while current systems work well for their intended purpose, it is desirable to provide continuous improvement in the relevant art.

SUMMARY

According to one example aspect of the invention, an exhaust sound enhancement (ESE) system for a vehicle without an internal combustion engine is provided. In one exemplary implementation, the ESE system includes one or more speakers, an amplifier configured to generate and play sounds on the one or more speakers, and a tuned exhaust assembly with a housing configured to resonate, amplify and inter-modulate the sounds from the one or more speakers to mimic exhaust sounds that would be produced by a predetermined internal combustion engine.

In addition to the foregoing, the described ESE system may include one or more of the following features: wherein the one or more speakers includes a first woofer, a second woofer, a first midrange speaker, and a second midrange speaker, and wherein the tuned exhaust assembly includes a first woofer chamber at least partially housing the first woofer and configured to resonate and amplify low frequency sound waves from the first woofer, a second woofer chamber at least partially housing the second woofer and configured to resonate and amplify low frequency sound waves from the second woofer, a first midrange chamber at least partially housing the first midrange speaker and configured to resonate and amplify midrange frequency sound waves from the first midrange speaker, and a second midrange chamber at least partially housing the second midrange speaker and configured to resonate and amplify midrange frequency sound waves from the second midrange speaker.

In addition to the foregoing, the described ESE system may include one or more of the following features: wherein the tuned exhaust assembly further includes a mixing chamber, a first woofer port connected between the first woofer chamber and the mixing chamber, the first woofer port configured to receive and guide the low frequency sound waves from the first woofer chamber to the mixing chamber, a second woofer port connected between the second woofer chamber and the mixing chamber, the second woofer port configured to receive and guide the low frequency sound waves from the second woofer chamber to the mixing chamber, a first midrange port connected between the first midrange chamber and the mixing chamber, the first midrange port configured to receive and guide the midrange frequency sound waves from the first midrange chamber to the mixing chamber, and a second midrange port connected between the second midrange chamber and the mixing chamber, the second midrange port configured to receive and guide the midrange frequency sound waves from the second midrange chamber to the mixing chamber, wherein the mixing chamber is configured to (i) inter-modulate the low frequency sound waves from the first woofer port and the midrange frequency sound waves from the first midrange port to produce a first portion of mimicked exhaust sounds, and (ii) inter-modulate the low frequency sound waves from the second woofer port and the midrange frequency sound waves from the second midrange port to produce a second portion of mimicked exhaust sounds.

In addition to the foregoing, the described ESE system may include one or more of the following features: a sensor system configured to monitor and sense an operational condition of the vehicle, and a controller in signal communication with the sensor system and the amplifier, and configured to receive one or more signals from the sensor system indicative of the sensed operation condition of the vehicle, wherein the controller is configured to, based on the one or more received signals, generate the sounds with the amplifier and one or more speakers, to thereby produce the mimicked exhaust sounds, which mimic exhaust sounds that would be produced by the predetermined internal combustion engine operating at the sensed operational condition of the vehicle.

In addition to the foregoing, the described ESE system may include one or more of the following features: wherein the sensor system comprises at least one of an accelerator pedal position sensor, a motor speed sensor, a wheel speed sensor, and a motor torque sensor; wherein the sensor system includes an accelerator pedal position sensor configured to sense a position of an accelerator pedal of the vehicle, a motor speed sensor configured to sense a speed of a motor of the vehicle, a wheel speed sensor configured to sense a rotational speed of one or more wheels of the vehicle, and a torque sensor configured to sense a torque generated by the motor, wherein the controller is configured to, based on signals received from the accelerator pedal position sensor, the motor speed sensor, the wheel speed sensor, and the torque sensor, generate the sounds with the amplifier and one or more speakers, to thereby produce the mimicked exhaust sounds, which mimic exhaust sounds that would be produced by the predetermined internal combustion engine operating at the sensed operational condition of the vehicle.

In addition to the foregoing, the described ESE system may include one or more of the following features: wherein the one or more speakers includes a woofer and a midrange speaker, and wherein the tuned exhaust assembly includes a woofer chamber at least partially housing the woofer and configured to resonate and amplify low frequency sound waves from the woofer, and a midrange chamber at least partially housing the midrange speaker and configured to resonate and amplify midrange sound waves from the midrange speaker; and wherein the tuned exhaust assembly further includes a woofer port connected to the woofer chamber and configured to receive and guide the low frequency sound waves from the woofer chamber, and a midrange port connected to the midrange chamber and configured to receive and guide the midrange frequency sound waves from the midrange chamber.

In addition to the foregoing, the described ESE system may include one or more of the following features: wherein the tuned exhaust assembly further includes a mixing chamber connected to the woofer port and the midrange port, wherein the mixing chamber is configured to inter-modulate the low frequency sound waves and the midrange frequency sound waves to produce the mimicked exhaust sounds; and wherein the tuned exhaust assembly further includes one or more exit ports configured to imitate an internal combustion engine vehicle exhaust port, wherein the mixing chamber directs the mimicked exhaust sounds out of the one or more exit ports to an exterior of the vehicle to produce an authentic internal combustion engine exhaust sound on the exterior of the vehicle.

According to another example aspect of the invention, a vehicle without an internal combustion engine is provided. The vehicle includes, in one exemplary implementation, a motor configured to generate and transfer torque to one or more axles, a sensor system configured to monitor and sense an operational condition of the vehicle, an exhaust sound enhancement (ESE) system including an amplifier, one or more speakers, and a tuned exhaust assembly, and a controller in signal communication with the sensor system and the ESE system. The controller is configured to receive one or more signals from the sensor system indicative of the sensed operational condition of the vehicle. The controller is configured to, based on the one or more received signals, generate and play sounds on the one or more speakers. The tuned exhaust assembly includes a housing configured to resonate, amplify, and inter-modulate the sounds from the one or more speakers to mimic exhaust sounds that would be produced by a predetermined internal combustion engine operating at the sensed operational condition of the vehicle.

In addition to the foregoing, the described vehicle may include one or more of the following features: wherein the one or more speakers includes a woofer and a midrange speaker, and wherein the tuned exhaust assembly includes a woofer chamber at least partially housing the woofer and configured to resonate and amplify low frequency sound waves from the woofer, and a midrange chamber at least partially housing the midrange speaker and configured to resonate and amplify midrange sound waves from the midrange speaker; and wherein the tuned exhaust assembly further includes a woofer port connected to the woofer chamber and configured to receive and guide the low frequency sound waves from the woofer chamber, and a midrange port connected to the midrange chamber and configured to receive and guide the midrange frequency sound waves from the midrange chamber.

In addition to the foregoing, the described vehicle may include one or more of the following features: wherein the tuned exhaust assembly further includes a mixing chamber connected to the woofer port and the midrange port, wherein the mixing chamber is configured to inter-modulate the low frequency sound waves and the midrange frequency sound waves to produce the mimicked exhaust sounds; and wherein the tuned exhaust assembly further includes one or more exit ports configured to imitate an internal combustion engine vehicle exhaust port, wherein the mixing chamber directs the mimicked exhaust sounds out of the one or more exit ports to an exterior of the vehicle to produce an authentic internal combustion engine exhaust sound at the exterior of the vehicle.

In addition to the foregoing, the described vehicle may include one or more of the following features: wherein the sensor system comprises at least one of an accelerator pedal position sensor, a motor speed sensor, a wheel speed sensor, and a motor torque sensor; and wherein the sensor system includes an accelerator pedal position sensor configured to sense a position of an accelerator pedal of the vehicle, a motor speed sensor configured to sense a speed of a motor of the vehicle, a wheel speed sensor configured to sense a rotational speed of one or more wheels of the vehicle, and a torque sensor configured to sense a torque generated by the motor, wherein the controller is configured to, based on signals received from the accelerator pedal position sensor, the motor speed sensor, the wheel speed sensor, and the torque sensor, generate the sounds with the amplifier and one or more speakers, to thereby produce the mimicked exhaust sounds.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings references therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

Figure 1:
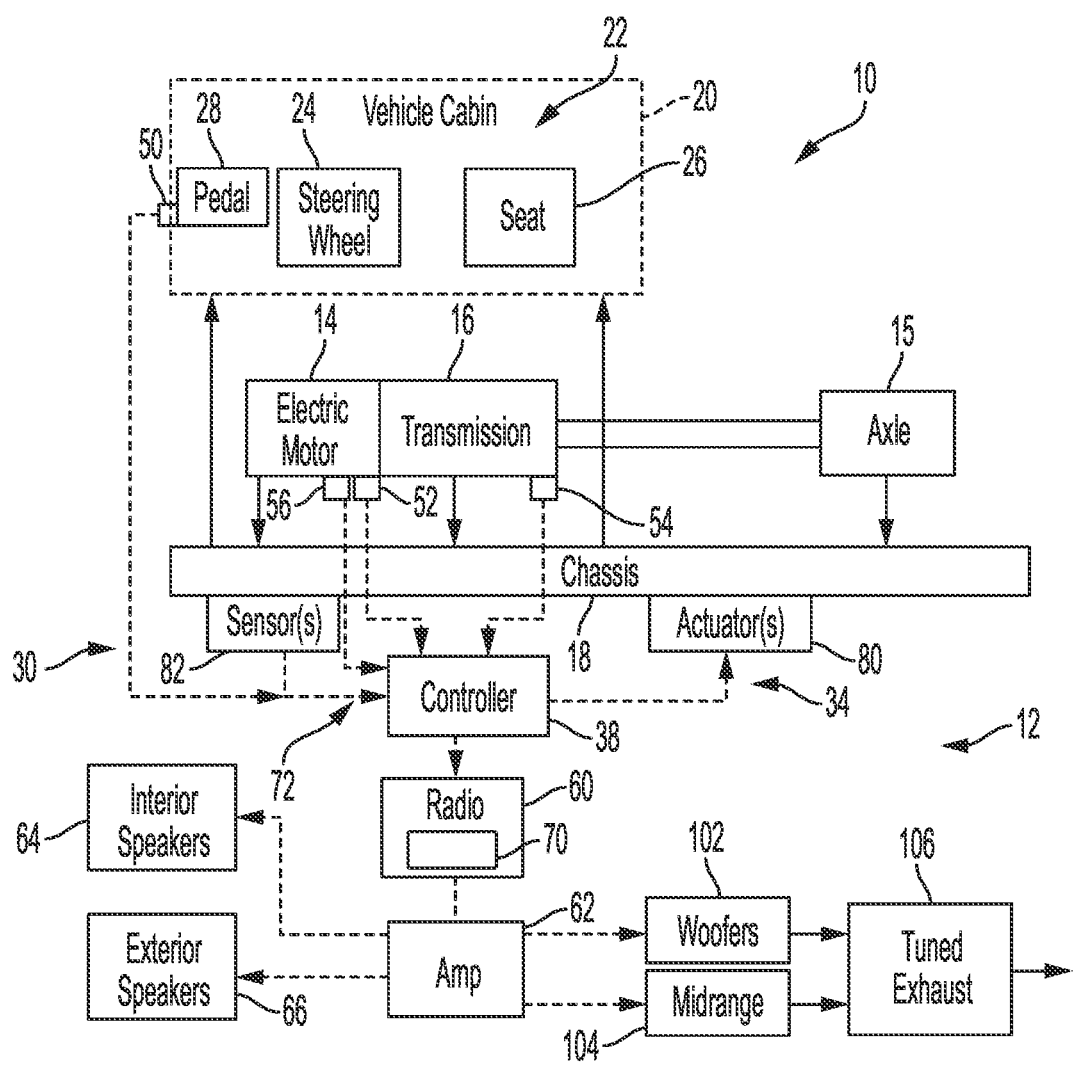
FIG. 1 is a schematic illustration of a vehicle with an example vibroacoustic enhancement system according to the principles of the present disclosure.

Described herein are systems and methods for a vibroacoustic enhancement (VE) system configured to uniquely combine sound and tactile vibration to provide an authentic "internal combustion engine" vibroacoustic experience in an electric vehicle. The VE system includes an active sound enhancement (ASE) system, an active vibration enhancement (AVE) system, and an exhaust sound enhancement (ESE) system.

The ASE system, in one exemplary implementation, utilizes powertrain and vehicle CAN bus information to playback sample based (e.g., .wav) audio files through a multi-layer synthesis engine. The audio output feeds one or more vehicle amplifiers. For example, one amplifier may drive the interior media/entertainment speakers for the driver and passenger sound experience, while the second amplifier may drive an exterior speaker/transducer system to provide a bystander sound experience. The exterior/transducer design could include bandpass speaker enclosures with tuned ports exiting the rear of the vehicle. The exterior system could double as a pedestrian warning sound.

As noted above, the vehicle includes an active vibration enhancement (AVE) system configured to work in concert with the ASE system. The AVE system is configured to read occupant and vehicle inputs and produce a vibration force to the vehicle that gives the occupant vibration and sound feedback they expect from an internal combustion engine vehicle. The vibration force is generated by force generators that transfer vibration through the car body to the driver/passengers, while also generating airborne radiated sound. In some examples, the force generators are configured to focus or "steer" the audio and vibratory levels to specific points in the vehicle spatially. For example, the system is configured to steer a maximum response or a null to the specific location (e.g., seat, steering wheel, armrest, etc.) by adjusting the magnitude and phase of the onboard vibration and sound generators.

Accordingly, the vibration is tailored to be harmonized with the sound from the ASE system by optimizing the magnitude and phase from the force generators so as to compliment the sound experience, thereby adding authenticity since part of the sound is generated by the actual car body structure. Thus, the occupants feel and hear matching sound and vibration that is more believable than systems that only "pump in" engine sounds through the vehicle audio system. Moreover, the driver will know the vehicle is on and ready to drive because it provides audible and tactile feedback to the driver, which does not occur with current electric vehicles and can lead to unintended vehicle movement.

In some examples, the VE system includes the ESE system, which is configured to increase the sound level of BEV vehicles, provide a pedestrian alert system, and produce a unique sound experience of a high-performance vehicle. In some examples, the system includes high-performance external speakers, a high-powered amplifier, and a tuned exhaust assembly to produce authentic exhaust sounds that can reach output levels similar to that of a high-performance vehicle with an internal combustion engine.

The ESE system is designed to output a vehicle-specific sound profile that emphasizes sounds in the desired range for that vehicle. In the example embodiment, the tuned exhaust assembly utilizes low frequency speakers and midrange frequency speakers, which exist in separate tuned chambers. The individual sound waves are then combined in a mixing chamber, which inter-modulates the sound waves creating additional waves. The desired sound waves are passed along a simulated "exhaust" port where they are directed to the outside specifically to create an authentic high-performance sound to an observer. Advantageously, the system utilizes digitally created sounds with some basic filtering, but uses the tuned exhaust assembly to fine tune the sound in the acoustic domain instead of the digital domain, which creates a more authentic sound.

With initial reference to FIG. 1, an electric vehicle 10 (e.g., BEV) with a vibroacoustic enhancement (VE) system 12 is illustrated. As discussed above, the VE system 12 is configured to generate and combine tactile vibration and sound, which is then transmitted through the car body and sound system to immerse the occupants in an authentic "internal combustion engine" vibroacoustic experience. The vehicle 10 includes one or more electric motors 14 that generate and transfer torque to one or more axles 19 via shafts or other components (e.g., a differential). The vehicle 10 further includes a frame or chassis 16, which supports a vehicle body 18 that at least partially defines a vehicle cabin 20 housing touch points of an occupant, such as a steering wheel 22, a seat 24 (e.g., a seat track), and an accelerator pedal 26.

In the example embodiment, the VE system 12 generally includes a sensor system 30, an active sound enhancement (ASE) system 32, an active vibration enhancement (AVE) system 34, and an exhaust sound enhancement (ESE) system 100.

In the example implementation, the sensor system 30 includes one or more sensors 36 that interact with the vehicle 10 and are in signal communication with a controller 38. In the example implementation, sensors include a pedal position sensor 50, a motor speed sensor 52, wheel speed sensor(s) 54, and an electric motor torque sensor 56. The pedal position sensor 50 is configured to sense a position of the accelerator pedal 26, the motor speed sensor 52 is configured to sense a speed of the electric motor 14, the wheel speed sensor 54 is configured to sense a rotational speed of one or more vehicle wheels (not shown), and torque sensor 56 is configured to sense a magnitude of torque generated by the electric motor 14. However, sensor system 30 can include any suitable sensor that enables the system to function as described herein.

With continued reference to FIG. 1, the ASE system 32 will be described in more detail. In general, the ASE system 32 utilizes powertrain and vehicle CAN bus information to playback sample-based audio files (e.g., .wav) through a multi-layer synthesis engine to mimic the sounds of a desired internal combustion engine. In the example embodiment, the ASE system 32 generally includes a radio 60, one or more ASE amplifiers 62, an interior speaker system 64, and an exterior speaker/transducer system 66.

The radio 60 is configured to receive user input, for example, via a touchscreen 70. The ASE amplifier 62 is configured to provide audio signals to the internal/external speaker systems 64, 66. In some examples, the interior and exterior speaker systems 64, 66 may each have a separate dedicated ASE amplifier 62. In operation, the ASE amplifier 62 generates and/or activates one or more internal sound profiles based on information received from the sensor system 30 and controller 38 via a CAN bus 72, and subsequently provides high level audio signals (e.g., for those profiles) to the interior and exterior speaker systems 64, 66. For example, the ASE amplifier 62 generates sound profiles matching or similar to those of an internal combustion engine operation at a particular pedal position, motor speed, wheel speed, and engine torque. As such, the interior and exterior speaker systems 64, 66 are configured to produce predetermined low/mid/high frequency internal combustion engine sounds to mimic combustion engine operation at those speeds/conditions of the electric vehicle 10. Moreover, the exterior speaker system 66 can additionally function as a pedestrian warning sound system to alert pedestrians of a presence of the vehicle.

Figure 2:
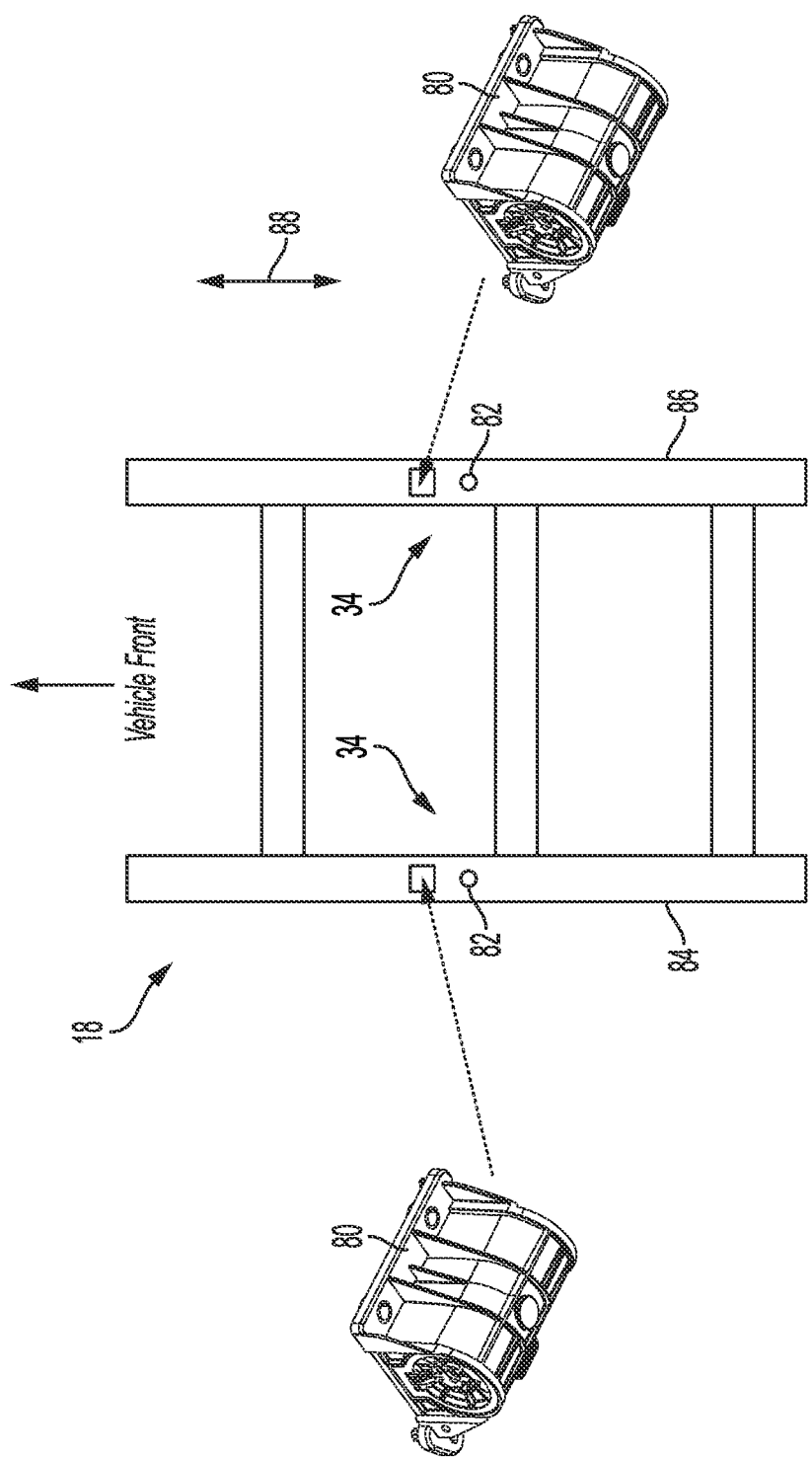
FIG. 2 is illustrates an example chassis and force generators of the vehicle shown in FIG. 1, according to the principles of the present disclosure.

With reference now to FIGS. 1 and 2, the AVE system 34 will be described in more detail. In general, the AVE system 34 utilizes powertrain and vehicle CAN bus information from controller 38 and CAN bus 72 to produce a vibration force on the vehicle 10 that mimics or is similar to the vibration force produced by an internal combustion engine. In some examples, the vibration is harmonized with the sound from the ASE system 32 in order to provide an authentic combustion engine vibroacoustic experience.

Figure 3:
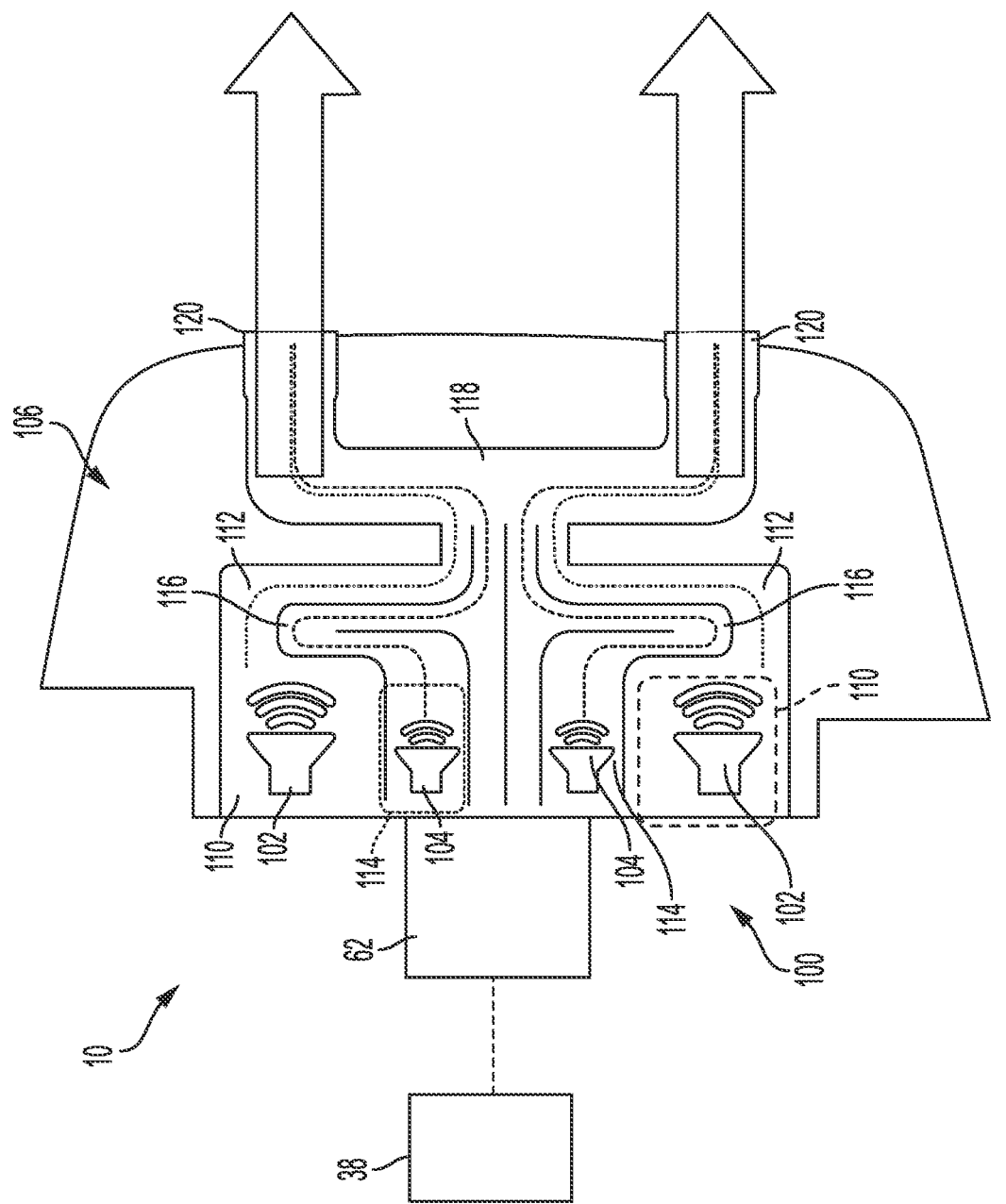
FIG. 3 is a schematic illustration of an example exhaust sound enhancement system of the vehicle shown in FIG. 1, according to the principles of the present disclosure.

In the example embodiment, the AVE system 34 generally includes one or more force generators 80 and one or more optional sensors 82 coupled proximate or directly to various locations of the vehicle chassis 16. For example, as shown in FIG. 3, a force generator 80 and sensor 82 are coupled to a bottom of both the left- and right-hand sides of a front portion of the chassis 16. However, force generators 80 may be disposed in any suitable area of the vehicle in order to produce the desired vibratory effect such as, for example, on the steering wheel/column, on a vehicle seat, etc.

Each force generator 80 is configured to generate a vibrational force in at least one direction or along at least one axis that mimics or is similar to a vibration force generated by a predetermined internal combustion engine. In one example, each force generator 80 includes a rare earth magnet and an electromagnetic field generator (e.g., a copper winding) that varies an electrical field around the magnet to alter the momentum of the magnet and vary the vibrational force applied to the chassis 16. Moreover, it should be noted that AVE system 34 is configured to create vibration in the vehicle body, rather than dampen already existing vibration in the vehicle body.

In the example implementation shown in FIG. 2, the AVE system 34 includes dual force generators 80 respectively disposed directly on or proximate to a left frame rail 84 and a right frame rail 86 of the chassis 16. Each of the force generators 80 is a lateral force generator or shaker configured to generate a vibrational force in first/second opposing directions (see arrows 88). Dual sensors 82 are respectively disposed directly on or proximate to the left frame rails 84 and the right frame rail 86. In the example embodiment, the sensors 82 are accelerometers configured to measure vibrational force along a specific axis (e.g., arrows 88). While a single pair of force generators 80 and a single pair of sensors 82 are shown, it will be appreciated that additional actuators and/or sensors could be implemented.

In the example implementation, the force generators 80 are configured to: generate global vibration throughout the vehicle 10; provide frequency sweep mapping to customizable shift patterns; reproduce idle, run, and shift characteristics using force/frequency modulation; provide adjustable parameters to mimic internal combustion engine applications; create unique and customizable vehicle signature(s); control target vibration at specific frequency ranges; provide multiple vibration variants or levels (e.g., for Auto/Sport/Track/Custom vehicle operational modes); have customizable mounting footprints/options; and/or be utilized for additional notifications such as "lane departure" or "driver warning" systems. In one example, controller is configured to operate the force generators to generate vibration profiles specific to brands (e.g., vehicle, engine, etc.).

The AVE system 34 advantageously provides the driver tactile feedback to match their audible experience, alerts the driver that the vehicle is powered and in Drive mode (capable of launching) thus preventing unintended vehicle motion, alerts the driver of lane departures, provides sufficient amplitude low-frequency sound to emulate powerful muscle cars in idle condition, and adds to an acoustic vehicle alerting system (AVAS) pedestrian alert. Moreover, the produced vibration in the vehicle body 18 can be turned into a desired airborne radiated sound.

As such, the ASE and AVE systems 32, 34 uniquely combine tactile vibration and sound, which is transmitted through the car body with sound generated by the ASE system 32, in-vehicle audio system 64, and also by external loudspeakers 66 together with the proper magnitude and phase in order to immerse the occupants in an authentic vibroacoustic experience, which provides an authentic unique brand experience. The vibratory response and part of the audio is generated/transmitted through the car body itself. The occupants feel and hear matching sound and vibration that is more realistic than pure audio. The VE system 12 is configured to focus/steer the audio and vibratory levels to specific points in the vehicle spatially (e.g., the system can direct a maximum response or a null to the seat, steering wheel, armrest, etc.) based on strategic adjustment of the magnitude and phase of the inboard vibration and sound generators. The system is also configured to accentuate existing vehicle resonances or to linearize (flatten) the vehicles naturally non-linear response.

With reference now to FIGS. 1 and 3, the ESE system 100 will be described in more detail. In general, the ESE system 100 monitors and utilizes powertrain and vehicle CAN bus information from controller 38 and CAN bus 72. The ESE system 100 feeds those signals to the ASE amplifier 62, which in turn synthesizes the audio signals, to thereby create an authentic high performance internal combustion engine sound at the exterior of vehicle 10, as described herein in more detail.

In the example embodiment, the ESE system 100 generally includes an amplifier (e.g., ASE amplifier 62), one or more ESE woofers 102, one or more ESE midrange speakers 104, and a tuned exhaust assembly 106. The ESE woofers 102 are in signal communication with the amplifier 62 and configured to produce a predetermined low frequency BEV raw exhaust sounds (e.g., 70 Hz-300 Hz), and the ESE midrange speakers 104 are in signal communication with the amplifier 62 and configured to produce a predetermined mid/high frequency BEV raw exhaust sounds (e.g., >300 Hz). The tuned exhaust assembly 106 is configured to physically condition sound waves and mix and combine the low/mid/high frequencies with a unique and specifically designed chamber to provide unique and authentic internal combustion engine exhaust sounds.

With continued reference to FIG. 3, in the example embodiment, the tuned exhaust assembly 106 is a housing generally including one or more woofer chambers 110, one or more woofer ports or channels 112, one or more midrange chambers 114, and one or more midrange ports or channels 116. The channels 112, 116 converge at a mixing chamber 118, which is connected to one or more "exhaust" ports 120 configured to imitate internal combustion engine exhaust ports. The woofer chamber 110 is tuned to mechanically resonate and amplify low frequency sounds (e.g., 70 Hz-300 Hz), and the woofer channel 112 shapes the low frequency sound waves and guides them to the mixing chamber 118. The midrange chamber 114 is tuned to mechanically resonate and amplify midrange sounds (e.g., >300 Hz), and the midrange channel 116 shapes the midrange sound waves and guides them to the mixing chamber 118. The mixing chamber 118 is mechanically designed to modulate sound waves. In one example, mixing chamber 118 inter-modulates the low and midrange sound waves to produce unique harmonic sounds based on the fundamental frequencies of each individual speaker/chamber. The exhaust ports 120 direct the sound waves to the external environment to generate a sound that mimics or is similar to a predetermined internal combustion engine exhaust sound.

In operation, the ESE system 100 is configured to monitor signals from the controller 38 and CAN bus 72 (e.g., from sensor system 30) such as accelerator pedal position, vehicle speed, motor speed, and motor torque, and subsequently feed those signals to the amplifier 62. Based on these signals, the amplifier 62 synthesizes corresponding audio signals and generates/plays specific predetermined sounds with the woofers/speakers 102, 104. Low frequency sound waves from the ESE woofers 102 exit the woofer chamber 110 and travel through the woofer channel 112 where they are shaped and guided to the mixing chamber 118. Similarly, midrange frequency sound waves from the ESE midrange speakers 104 exit the midrange chamber 114 and travel through the midrange channel 116 where they are shaped and guided to the mixing chamber 118. The mixing chamber 118 receives and inter-modulates the low and midrange frequency sound waves to produce unique harmonic sounds based on the fundamental frequencies of each individual speaker/chamber. As such, the mixing chamber 118 physically conditions and mechanically modulates the sound waves, which are subsequently directed out of the exhaust ports 120.

The dimensions of the tuned channels 112, 116 are based on the wavelength of the desired fundamental frequency of the speaker. The smaller midrange speakers 104 have smaller port dimensions, whereas the woofers 102 have larger port dimensions. The port dimensions are based on the wavelength $\lambda$ or $\lambda/2$ or $\lambda/4$ of the desired soundwave. The tuned channels 112, 116 pass the desired soundwaves (frequencies) from the speaker chambers 110, 114 into the mixing chamber 118. The mixing chamber 118 inter-modulates the soundwaves from each of the tuned channels 112, 116 thereby creating a collection of desired frequencies. In one example, the dimension and interior shape of the mixing chamber is based on the wavelength $\lambda$ of the lowest desired frequency and at least the second and third harmonic of that frequency (e.g., 300 Hz@20° $\lambda$=1.12 m, $\lambda/2$=0.565 m, $\lambda/4$=0.282 m).

The mixing chamber 118 will allow for the creation of standing waves of certain wavelengths (desired frequencies). The desired sound waves are passed along to the exhaust port 120 where they are directed to the outside specifically to create an authentic high-performance vehicle sound to the observer. The exhaust port dimensions are designed to direct the sound to the outside observer without creating internal standing waves. Additionally, the ESE system 100 can be tuned to provide sounds specific to each of various drive modes (e.g., comfort, sport, etc.), which allows for basic operation sound as well as more high-performance vehicle sounds.

Figure 4:
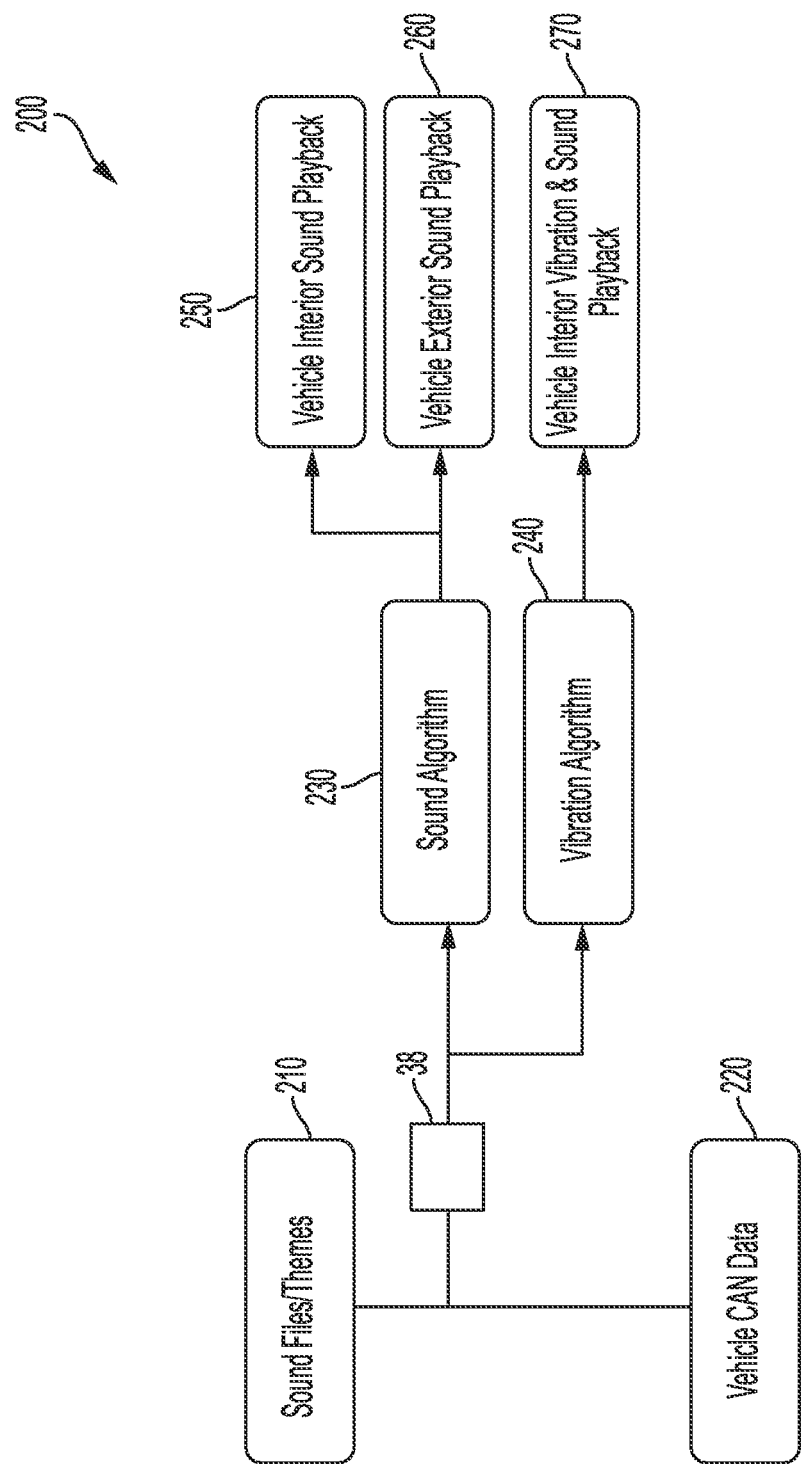
FIG. 4 is a flow diagram of an example method of controlling the vibroacoustic enhancement system of FIG. 1, according to the principles of the present disclosure.

Turning now to FIG. 4, a flow diagram 200 of the vibroacoustic enhancement (VE) system 12 control is illustrated. In the example embodiment, the VE system 12 includes sound files and themes 210, vehicle CAN data 220, a sound algorithm 230, a vibration algorithm 240, a vehicle interior sound playback 250, a vehicle exterior sound playback 260, and a vehicle interior vibration and sound playback 270. The sound files and themes 210 may be pre-generated sounds stored in controller 38. In the example embodiment, sound files and themes 210 can include dynamic internal combustion engine driving sounds such as, for example, acceleration, deceleration, and coasting with multiple sample based sound layers, as well as static trigger sounds such as an engine start, vehicle start, charge plug-in, etc.

The vehicle CAN data 220 includes various vehicle information such as, for example, vehicle speed, electric motor speed, electric motor torque, accelerator pedal position, and gear selection. In the example illustration, sound files and themes 210 and vehicle CAN data 220 are sent to the sound algorithm 230 and the vibration algorithm 240. The sound algorithm 230 is configured to adapt sound files/layers in real time in response to the vehicle CAN data 220. In one example, the sound algorithm 230 uses sample-based multi-layer pitched .wav playback. The sound algorithm 230 is utilized to produce the vehicle interior sound playback 250 and the vehicle exterior sound playback 260. The vehicle interior sound playback 250 is configured to generate vehicle sound output through the interior speaker system 64 (e.g., interior media/entertainment system speakers).

The vehicle exterior sound playback 260 is configured to generate vehicle sound output through the ESE system 100. For example, the exterior sound playback 260 may include an external transducer system capable of a predetermined sound (e.g., 125 dB from 70-7000 Hz@1.0 meter (+/−2 dB). Transducer components can include 2×-8"×12" woofer in bandpass and ported enclosure to cover 70-350 Hz frequency range, tuned ports routed to outside of the vehicle (e.g., through rear facia) for low frequency sound directionality, and 2×5" mid/high frequency drivers to cover 300-7000 Hz frequency range. Locations include under and behind rear facia and oriented at a predetermined angle (e.g., 45° downward angle).

The vibration algorithm 240 is configured to synthesize a particular engine (e.g., engine brand) vibration input to the vehicle (via AVE system 34) based on the vehicle CAN data 220. The vibration produced can be pre-harmonized/synchronized with audio outputs of the ASE system 32. Thus, the vibration algorithm 240 is configured to utilize the force generators 80 to produce the vehicle interior vibration and sound playback 270, to thereby excite portions of the vehicle 10 such as, for example, the vehicle body 18, steering wheel 22, and/or seat 24.

In one example, the vehicle interior vibration and sound playback 270 can include an external circular or linear force generator system capable of providing 0-100 N of circular or linear force directly to the car body 18. Transducer components may include circular or linear force generators 80, with controller 38 sending precise magnitude and phase-controlled signals harmonized with the ASE system 32, with 12V inputs and CAN signals (e.g., vehicle speed, pedal position, drive mode, torque request, etc.).

Described herein are systems and methods for a vibroacoustic enhancement system configured to generate "authentic" internal combustion engine sounds and vibration in electric vehicles without an internal combustion engine. The vibroacoustic enhancement system includes an active sound enhancement system, an active vibration enhancement system, and an exhaust sound enhancement system. The system utilizes powertrain and vehicle CAN bus information to playback sample-based audio files and generate vibrations on the vehicle body to simulate the presence of an internal combustion engine on the vehicle.

It will be appreciated that the term "controller" as used herein refers to any suitable control device or set of multiple control devices that is/are configured to perform at least a portion of the techniques of the present application. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present application. The one or more processors could be either a single processor or two or more processors operating in a parallel or distributed architecture.

It should be understood that the mixing and matching of features, elements and/or functions between various examples may be expressly contemplated herein so that one skilled in the art would appreciate from the present teachings that features, elements and/or functions of one example may be incorporated into another example as appropriate, unless described otherwise above.

What is claimed is:

1. An exhaust sound enhancement (ESE) system for a vehicle without an internal combustion engine, comprising:
   a plurality of speakers including a woofer and a midrange speaker;
   an amplifier configured to generate and play sounds on the plurality of speakers; and
   a tuned exhaust assembly with a housing configured to resonate, amplify and inter-modulate the sounds from the plurality of speakers to mimic exhaust sounds that would be produced by a predetermined internal combustion engine, the tuned exhaust assembly including:
      a mixing chamber configured to inter-modulate low frequency sound waves from the woofer and midrange frequency sound waves from the midrange speaker to produce the mimicked exhaust sounds; and
      one or more exit ports configured to imitate an internal combustion engine vehicle exhaust port, the one or more exit ports configured to receive the inter-modulated low and midrange frequency sound waves from the mixing chamber and direct the mimicked exhaust sounds out of the one or more exits ports to an exterior of the vehicle to produce an authentic internal combustion engine exhaust sound on the exterior of the vehicle.

2. The ESE system of claim 1, wherein the plurality of speakers includes a first woofer, a second woofer, a first midrange speaker, and a second midrange speaker, and wherein the tuned exhaust assembly further includes:
   a first woofer chamber at least partially housing the first woofer and configured to resonate and amplify low frequency sound waves from the first woofer;
   a second woofer chamber at least partially housing the second woofer and configured to resonate and amplify low frequency sound waves from the second woofer;
   a first midrange chamber at least partially housing the first midrange speaker and configured to resonate and amplify midrange frequency sound waves from the first midrange speaker; and
   a second midrange chamber at least partially housing the second midrange speaker and configured to resonate and amplify midrange frequency sound waves from the second midrange speaker.

3. The ESE system of claim 2, wherein the tuned exhaust assembly further includes:
   a first woofer port connected between the first woofer chamber and the mixing chamber, the first woofer port configured to receive and guide the low frequency sound waves from the first woofer chamber to the mixing chamber;
   a second woofer port connected between the second woofer chamber and the mixing chamber, the second woofer port configured to receive and guide the low frequency sound waves from the second woofer chamber to the mixing chamber;
   a first midrange port connected between the first midrange chamber and the mixing chamber, the first midrange port configured to receive and guide the midrange frequency sound waves from the first midrange chamber to the mixing chamber; and
   a second midrange port connected between the second midrange chamber and the mixing chamber, the second midrange port configured to receive and guide the midrange frequency sound waves from the second midrange chamber to the mixing chamber,
   wherein the mixing chamber is configured to (i) inter-modulate the low frequency sound waves from the first woofer port and the midrange frequency sound waves from the first midrange port to produce a first portion of mimicked exhaust sounds, and (ii) inter-modulate the low frequency sound waves from the second woofer port and the midrange frequency sound waves from the second midrange port to produce a second portion of mimicked exhaust sounds, and
   and wherein the one or more exit ports include a first exit port configured to receive the first portion of mimicked exhaust sounds, and a second exit port configured to receive the second portion of mimicked exhaust sounds.

4. The ESE system of claim 1, further comprising:
   a sensor system configured to monitor and sense an operational condition of the vehicle; and
   a controller in signal communication with the sensor system and the amplifier, and configured to receive one or more signals from the sensor system indicative of the sensed operation condition of the vehicle,
   wherein the controller is configured to, based on the one or more received signals, generate the sounds with the amplifier and the plurality of speakers, to thereby produce the mimicked exhaust sounds, which mimic exhaust sounds that would be produced by the predetermined internal combustion engine operating at the sensed operational condition of the vehicle.

5. The ESE system of claim 4, wherein the sensor system comprises at least one of an accelerator pedal position sensor, a motor speed sensor, a wheel speed sensor, and a motor torque sensor.

6. The ESE system of claim 4, wherein the sensor system comprises:
   an accelerator pedal position sensor configured to sense a position of an accelerator pedal of the vehicle;
   a motor speed sensor configured to sense a speed of a motor of the vehicle;
   a wheel speed sensor configured to sense a rotational speed of one or more wheels of the vehicle; and
   a torque sensor configured to sense a torque generated by the motor,
   wherein the controller is configured to, based on signals received from the accelerator pedal position sensor, the motor speed sensor, the wheel speed sensor, and the torque sensor, generate the sounds with the amplifier and the plurality of speakers, to thereby produce the mimicked exhaust sounds, which mimic exhaust sounds that would be produced by the predetermined internal combustion engine operating at the sensed operational condition of the vehicle.

7. The ESE system of claim 1, wherein the tuned exhaust assembly further includes:
   a woofer chamber at least partially housing the woofer and configured to resonate and amplify low frequency sound waves from the woofer; and
   a midrange chamber at least partially housing the midrange speaker and configured to resonate and amplify midrange sound waves from the midrange speaker.

8. The ESE system of claim 7, wherein the tuned exhaust assembly further includes:
   a woofer port connected to the woofer chamber and configured to receive and guide the low frequency sound waves from the woofer chamber; and a midrange port connected to the midrange chamber and configured to receive and guide the midrange frequency sound waves from the midrange chamber.

9. An exhaust sound enhancement (ESE) system for a vehicle without an internal combustion engine, comprising:
a woofer and a midrange speaker;
an amplifier configured to generate and play sounds on the woofer and midrange speaker; and
a tuned exhaust assembly with a housing configured to resonate, amplify and inter-modulate the sounds from the woofer and midrange speaker to mimic exhaust sounds that would be produced by a predetermined internal combustion engine, the tuned exhaust assembly including:
 a woofer chamber housing the woofer and configured to resonate and amplify low frequency sound waves from the woofer;
 a midrange chamber housing the midrange speaker and configured to resonate and amplify midrange sound waves from the midrange speaker;
 a mixing chamber configured to inter-modulate the low frequency sound waves and the midrange frequency sound waves to produce the mimicked exhaust sounds;
 a tubular woofer port connected between the woofer chamber and the mixing chamber, and configured to receive and guide the low frequency sound waves from the woofer chamber;
 a tubular midrange port connected between the midrange chamber and the mixing chamber, and configured to receive and guide the midrange frequency sound waves from the midrange chamber; and
 one or more exit ports configured to imitate an internal combustion engine vehicle exhaust port, the one or more exit ports configured to receive the inter-modulated low and midrange frequency sound waves from the mixing chamber and direct the mimicked exhaust sounds out of the one or more exit ports to an exterior of the vehicle to produce an authentic internal combustion engine exhaust sound on the exterior of the vehicle.

10. A vehicle without an internal combustion engine, comprising:
a motor configured to generate and transfer torque to one or more axles;
a sensor system configured to monitor and sense an operational condition of the vehicle;
an exhaust sound enhancement (ESE) system including an amplifier, a plurality of speakers including a woofer and a midrange speaker, and a tuned exhaust assembly; and
a controller in signal communication with the sensor system and the ESE system, and configured to receive one or more signals from the sensor system indicative of the sensed operational condition of the vehicle,
wherein the controller is configured to, based on the one or more received signals, generate and play sounds on the plurality of speakers, and
wherein the tuned exhaust assembly includes:
 a housing configured to resonate, amplify, and inter-modulate the sounds from the plurality of speakers to mimic exhaust sounds that would be produced by a predetermined internal combustion engine operating at the sensed operational condition of the vehicle;
 a mixing chamber configured to inter-modulate low frequency sound waves from the woofer and midrange frequency sound waves from the midrange speaker to produce the mimicked exhaust sounds; and
 one or more exit ports configured to imitate an internal combustion engine vehicle exhaust port, the one or more exit ports configured to receive the inter-modulated low and midrange frequency sound waves from the mixing chamber and direct the mimicked exhaust sounds out of the one or more exits ports to an exterior of the vehicle to produce an authentic internal combustion engine exhaust sound on the exterior of the vehicle.

11. The vehicle of claim 10, wherein the tuned exhaust assembly further includes:
a woofer chamber at least partially housing the woofer and configured to resonate and amplify low frequency sound waves from the woofer; and
a midrange chamber at least partially housing the midrange speaker and configured to resonate and amplify midrange sound waves from the midrange speaker.

12. The vehicle of claim 11, wherein the tuned exhaust assembly further includes:
a woofer port connected to the woofer chamber and configured to receive and guide the low frequency sound waves from the woofer chamber; and
a midrange port connected to the midrange chamber and configured to receive and guide the midrange frequency sound waves from the midrange chamber.

13. The vehicle of claim 10, wherein the sensor system comprises at least one of an accelerator pedal position sensor, a motor speed sensor, a wheel speed sensor, and a motor torque sensor.

14. The vehicle of claim 10, wherein the sensor system comprises:
an accelerator pedal position sensor configured to sense a position of an accelerator pedal of the vehicle;
a motor speed sensor configured to sense a speed of the motor of the vehicle;
a wheel speed sensor configured to sense a rotational speed of one or more wheels of the vehicle; and
a torque sensor configured to sense a torque generated by the motor,
wherein the controller is configured to, based on signals received from the accelerator pedal position sensor, the motor speed sensor, the wheel speed sensor, and the torque sensor, generate the sounds with the amplifier and plurality of speakers, to thereby produce the mimicked exhaust sounds.

15. The vehicle of claim 10, further comprising an active vibration enhancement (AVE) system, comprising:
a force generator coupled to a chassis of the vehicle and configured to generate vibrations into the chassis to be transmitted through the chassis to passengers of the vehicle,
wherein the controller is configured to, based on the one or more received signals, actuate the force generator to generate vibrations into the vehicle chassis that mimic vibrations that would be produced in the chassis by the predetermined internal combustion engine operating at the sensed operational condition of the vehicle.

16. The vehicle of claim 15, further comprising an active sound enhancement (ASE) configured to generate sound on an interior of the vehicle,
wherein the controller is configured to operate the ASE system to generate sound based on the one or more signals from the sensor system indicative of the sensed operational condition of the vehicle, to thereby mimic sounds that would be produced by the predetermined internal combustion engine operating at the sensed operational condition of the vehicle, and wherein the controller is further configured to actuate the force generator to harmonize the generated vibrations with the sound generated from the ASE system.

17. The vehicle of claim 10, wherein the one or more exits ports are located under and behind a rear fascia of the vehicle.

18. The ESE system of claim 9, further comprising an active vibration enhancement (AVE) system, comprising:

a force generator configured to couple to a chassis of the vehicle and generate vibrations into the chassis to be transmitted through the chassis to passengers of the vehicle, wherein the controller is configured to, based on the one or more received signals, actuate the force generator to generate vibrations into the vehicle chassis that mimic vibrations that would be produced in the chassis by the predetermined internal combustion engine operating at the sensed operational condition of the vehicle.

19. The ESE system of claim 9, wherein a dimension and an interior shape of the mixing chamber is based on a wavelength A of a lowest desired frequency and at least a second and a third harmonic of that desired frequency.

\* \* \* \* \*